United States Patent [19]

Cole, Jr. et al.

[11] Patent Number: 5,423,724
[45] Date of Patent: Jun. 13, 1995

[54] INTERLACED SINGLE PIN ROCKER JOINT CHAIN

[75] Inventors: Edward H. Cole, Jr., Utica, Mich.; Philip J. Mott, Dryden, N.Y.

[73] Assignee: Borg-Warner Automotive, Inc., Sterling Heights, Mich.

[21] Appl. No.: 196,598

[22] Filed: Feb. 15, 1994

Related U.S. Application Data

[63] Continuation-in-part of Ser. No. 961,077, Oct. 14, 1992, Pat. No. 5,334,111, which is a continuation-in-part of Ser. No. 778,409, Oct. 17, 1991, Pat. No. 5,192,253.

[51] Int. Cl.⁶ ............................ F16G 13/02
[52] U.S. Cl. ........................ 474/229; 474/230
[58] Field of Search ................ 474/212–217, 474/226, 228–231

[56] References Cited

U.S. PATENT DOCUMENTS

| | | | |
|---|---|---|---|
| 1,159,163 | 11/1915 | Best | 474/229 X |
| 1,496,298 | 6/1924 | Chapman | 474/213 X |
| 1,564,798 | 2/1924 | Sturtevant | 474/215 X |
| 1,644,656 | 10/1927 | Belcher | 474/216 |
| 1,651,832 | 12/1927 | Morse | 474/216 |
| 1,769,960 | 7/1930 | Morse | 474/215 X |
| 1,868,334 | 7/1932 | Morse | 474/215 X |
| 1,947,734 | 3/1933 | Perry | 474/214 |
| 1,951,764 | 3/1934 | Morse | 474/214 X |
| 1,974,338 | 7/1932 | McCann | 474/214 |
| 2,067,243 | 1/1937 | Perry | 474/215 |
| 2,266,688 | 12/1941 | Keller | 474/214 X |
| 2,413,843 | 12/1963 | Perry | 474/214 |
| 2,667,791 | 2/1954 | Bremer | 474/214 |
| 2,956,442 | 10/1960 | Krekeler | 474/229 |
| 3,213,699 | 12/1963 | Terepin | 474/215 |
| 3,340,745 | 9/1967 | McCann | 474/214 |
| 3,605,514 | 10/1971 | Mitchell | 474/229 |
| 3,636,788 | 1/1972 | Jeffrey | 474/213 |
| 4,337,057 | 6/1982 | Horowitz et al. | 474/242 |
| 4,342,560 | 8/1982 | Ledvina et al. | 474/157 |
| 4,507,106 | 3/1985 | Cole, Jr. | 474/215 |
| 4,737,137 | 4/1988 | Miyaishi | 474/245 |
| 4,759,740 | 7/1988 | Cradduck | 474/212 |
| 4,911,682 | 3/1990 | Ivey et al. | 474/245 |
| 4,986,799 | 1/1991 | Holweg | 474/240 |
| 5,007,883 | 4/1991 | Cole, Jr. et al. | 474/242 |
| 5,176,587 | 1/1993 | Mott | 474/216 |
| 5,192,253 | 3/1993 | Cole et al. | 474/214 |

FOREIGN PATENT DOCUMENTS

| | | | |
|---|---|---|---|
| 670185 | 11/1929 | France | 474/214 |
| 26652 | 12/1905 | United Kingdom | 474/215 |
| 336379 | 10/1930 | United Kingdom | 474/214 |

Primary Examiner—Roger J. Schoeppel
Attorney, Agent, or Firm—Willian Brinks Hofer; Greg Dziegielewski

[57] ABSTRACT

A rocker joint for a power transmission chain is formed from a single pin and an associated link aperture. The pin has a substantially flat front surface and a convex back surface, with the back surface being defined by a plurality of radii. The pin is received in the aperture of the link such that the front surface of the pin engages and rocks on the curved surface of the link aperture. The back surface of the pin is movable in the aperture of the links as the surfaces move relative to one another when the chain articulates.

38 Claims, 9 Drawing Sheets

Fig. 7
Fig. 8
Fig. 9
Fig. 10
Fig. 11
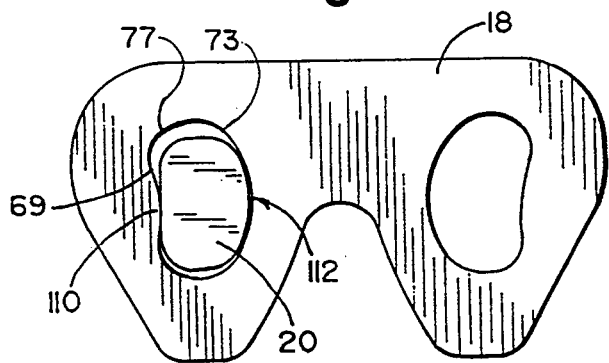
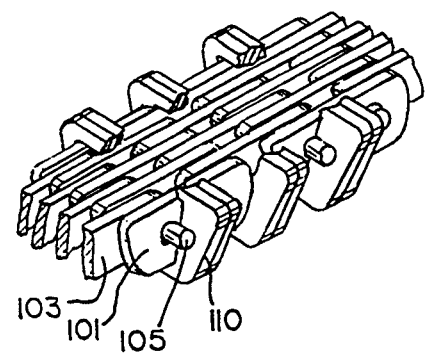
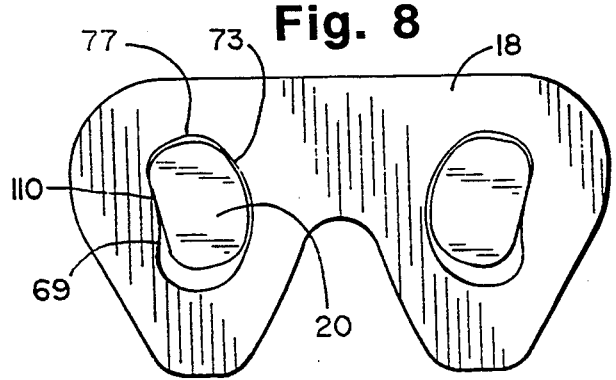
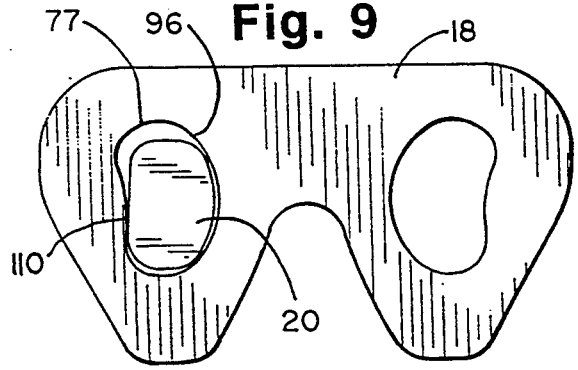
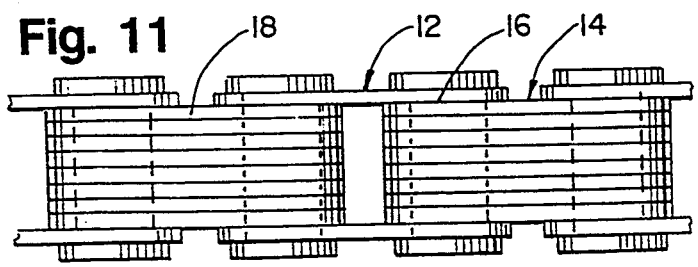

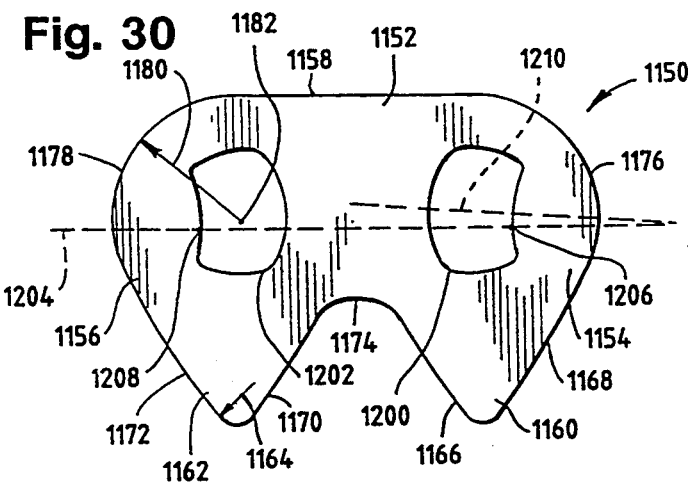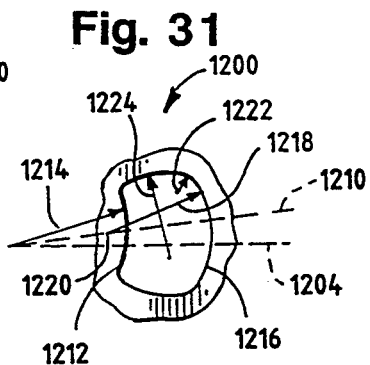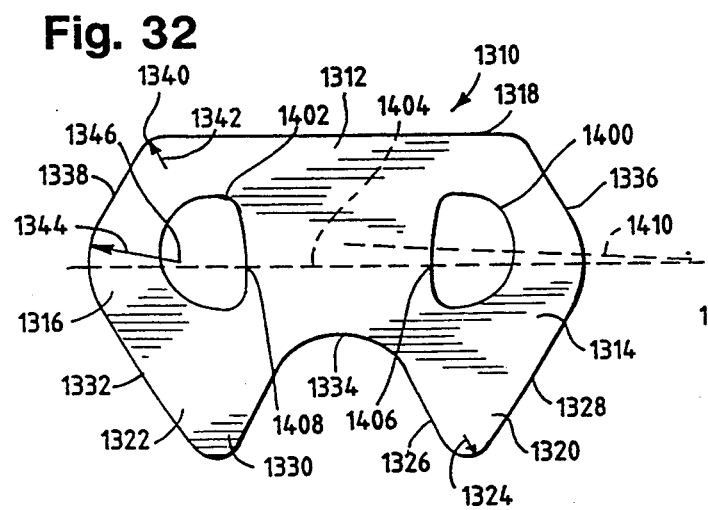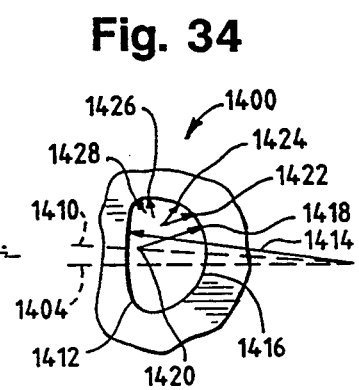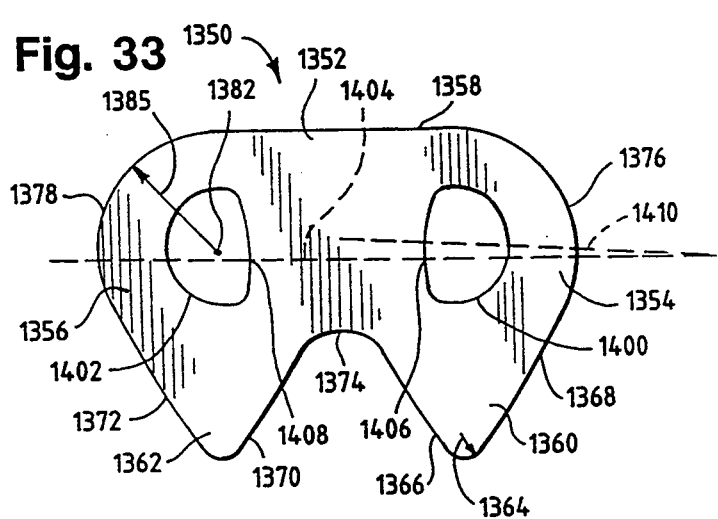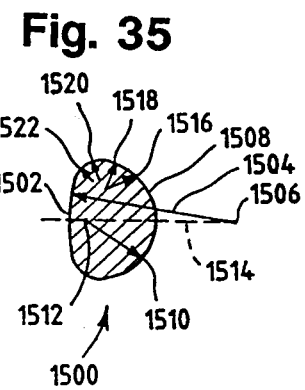

INTERLACED SINGLE PIN ROCKER JOINT CHAIN

This application is a continuation-in-part application of U.S. Ser. No. 07/961,077 filed Oct. 14, 1992, now U.S. Pat. No. 5,334,111, which is a continuation-in-part of U.S. Ser. No. 778,409 filed Oct. 17, 1991, now U.S. Pat. No. 5,192,253 both of which are incorporated herein by reference.

BACKGROUND OF THE INVENTION

Reference is made to U.S. Pat. No. 5,176,587 to Philip J. Mott, entitled "Single Pin Rocker Joint Bushing Chain," which is related to the subject matter of the present application and is incorporated herein by reference.

1. Field of the Invention

The present invention relates generally to power transmission chains and particularly to an improved rocker joint for such chains. The rocker joint is formed from a single pin and an associated link aperture. The invention has application to power transmission chains of the silent chain variety, as well as power transmission chains for use with variable pulley transmissions (continuously variable transmissions).

2. Description of the Prior Art

Power transmission chains are widely used in the automotive industry. Such chains are used for engine timing drives as well as for the transfer of power from the engine to the transmission, the transfer of power in a transfer case, or the transfer of power within a transmission. Power transmission chains are also widely used in industrial applications.

One type of power transmission chain is referred to as a "silent chain". Such a chain is formed of interleaved sets of inverted moth links. A set or rank of links is assembled from several links positioned alongside of or laterally adjacent to each other. Each link has a body with a pair of spaced apertures and the apertures of one set of links are arranged and aligned with the apertures of the next adjacent set of interleaved links. The links have a pair of depending toes separated by a crotch.

The links are connected by pivot members, which are typically round pins received in the link apertures. The pivot members can also comprise a rocker joint, which may include a pin and a rocker. Each pin and rocker has a front face which contact and rock on each other. An example of a silent chain is found in U.S. Pat. No. 4,342,560, which is incorporated herein by reference. An example of a silent chain which can be used in engine timing applications is found in U.S. Pat. No. 4,759,740, which is also incorporated herein by reference.

A second type of power transmission chain is used to transfer power between a pair of variable pulleys in a continuously variable transmission. The chain links are provided in sets that are interleaved together. The links have aligned apertures for receiving pivot members. The pivot members can provide the means for the transfer of power between the chain and the sheaves of the pulley by allowing the sheaves to directly contact the ends of the pivot members in a driving engagement.

Load blocks or load carrying members that are positioned on the chain between the spaced pivot members can also provide the means for transfer of power between the pulleys. The load blocks can be in the form of struts that are carried in a passageway below the links. Alternatively, the load blocks can extend around the links of the chain and have one or more windows for receiving the chain links therein. The load blocks have tapered outer or end surfaces which engage the sheave faces of the pulleys to provide the driving engagement between the pulleys and the chain. Examples of power transmission chains suitable for use in a continuously variable transmission are shown in U.S. Pat. Nos. 4,911,682, 4,507,106, and 5,007,883, which are incorporated herein by reference.

The present invention relates to an improved rocker joint for power transmission chain. Rocker joints for chains are known in the art. Rocker joints are utilized in an attempt to attain higher efficiencies and less wear than comparable round pin joints. Round pin joints typically produce higher wear as a result of the sliding action between the round pin and the inside of the circular link aperture, as the chain articulates. In contrast, rocker joints provide a lower wear joint because of the rocking action between the pin and the rocker portion, as the chain articulates.

U.S. Pat. No. 4,507,106 discloses a rocker joint having two pins in which, in the preferred embodiment, each pin or rocker has the identical cross-section. Each pin has a front surface which rocks on the front surface of the adjacent pin. In the preferred embodiment, the pins have a front surface defined by a first radius, and a back surface defined by a second and a third radius, both progressively smaller than the first radius. The rocker joint comprises a pair of pins fitted into each group of aligned apertures in the interleaved sets of links to join the links and permit articulation.

U.S. Pat. No. 4,911,682 discloses a rocker joint that includes a pair of pins. The rocker joint has apertures that are a generally hour-glass shape with the enlarged ends receiving the pins. The front surfaces of the pins rock against one another, while the back surfaces of the pins are prevented from substantial rotation by the curvature of the apertures.

These prior art patents represent examples of rocker joints utilizing two pivot members or pins, or a pin and a rocker. The present invention relates to single pin rocker joints in which a single pin rocks against the link aperture. U.S. Pat. No. 2,667,791 discloses a silent chain with a single pin rocker joint. The chain has a single pin with an arcuate periphery, formed by a single radius, and a relatively flat beating surface. The link has a generally semi-circular aperture with an arcuate beating surface. The flat surface of the pin rocks against the arcuate surface of the link aperture.

Another type of single pin rocker joint is shown in U.S. Pat. No. 4,337,057. The patent discloses a double unrolling hinge for a chain-belt for a variable pulley transmission. Both sides of the hinge pin contact the insides of the link apertures.

U.S. Pat. No. 1,564,798 also discloses a single pin, double-edged rocking joint. The pin is thicker in the center section than at the top and bottom. The formation of the link aperture allows the sides of the pin to roll against the aperture sides of adjacent, interleaved links.

The present invention provides an improved single pin rocker joint for a power transmission chain. The construction of the pin includes a substantially flat rocking surface and an arcuate surface formed of a plurality of radii. In the silent chain embodiment, a clearance between the back surface of the pin and the associated aperture permits movement of the pin with respect to the aperture. The chain includes inside links and guide links and has application in timing drives as well as drives for continuously variable transmissions.

SUMMARY OF THE INVENTION

In accordance with one embodiment of this invention, a power transmission chain is constructed of an assembly of links and pivot members. The chain includes a plurality of sets of guide links interleaved with sets of inside links. Each guide link and inside link has a pair of spaced apertures. To assemble the chain, the apertures of one link set are transversely aligned with apertures of the next adjacent link set.

The apertures are defined by a series of surfaces. The apertures within the guide links have at least one curved surface and the apertures within at least some of the inside links have a plurality of curved surfaces.

Pivot members, in the form of pins, are fitted within the apertures of the links. The pins have a substantially flat front surface and a convex back surface. The pivot member back surface is defined by a first radius. The pivot members are press fit in the apertures of the guide links such that the pivot member back surface engages the curved surface defined by the guide link. The press fit prevents substantial rotation of the pin relative to the guide link.

As a result of a minimal clearance between the back surface of the pin and the associated aperture of at least some the inside links, the back surfaces of the pivot members are allowed to move freely within the apertures of at least some of the inside links of the chain. The front surface of the pivot member and a curved surface of the aperture of at least some of the inside links engage and rock on one another with a rolling type action.

The apertures of at least some of the inside links are formed by a series of radii. These apertures are rotated with respect to a horizontal centerline of the body of the link in order to provide a positive tilt angle. In one embodiment, the apertures of the guide links have a flat surface that matches the flat surface of the pin and is perpendicular with respect to the horizontal centerline of the link as well as the pitch line of the link. The apertures of at least some of the inside links are formed and spaced to provide a pitch length that is greater than the pitch length of the guide links.

The rocker joint of the present invention may be used in an inverted tooth silent chain or in a power transmission chain for a continuously variable transmission. In the silent chain use, the inside links include a pair of depending teeth that are formed to contact a sprocket for driving of the chain. In one embodiment, the sets of inside links may be block laced so that there are no inside links in the guide row. In another embodiment, the sets of inside links may be interlaced so that sets of inside links will be provided in the guide link row and other sets of inside links will be provided in the non-guide link row. In the use for a continuously variable transmission, the links include load carrying members in the form of load blocks. The load blocks may extend around the links or through a passageway formed in the base of the links. Alternatively, the pins may contact the pulley sheaves to provide the power transfer.

In the power transmission chain for the continuously variable transmission, the chain includes sets of guide links and sets of inside links. One set of inside links are links that are in the non-guide rows. Another set of inside links are in the guide row. The inside links are configured to rotate with respect to the pins. The sets of guide links include pairs of external or flanking guide links which are located on the outside of the rows or sets. The flanking guide links are preferably press fit on the pins. That is, the pins are fit within the apertures of the flanking guide links so that the pins do not rotate with respect to the flanking guide links. Additionally, the inside guide row links may be press fit on the pins. In such a chain, the inside guide row links also have an aperture configured to match the cross-section of the pin and thus prevent rotation of the link with respect to the pin. Alternately, the inside guide row links may have apertures that are configured to allow rotation of the link with respect to the pin.

The rocker joint of the present invention, which is used in an inverted tooth (or silent) power transmission chain, may also be used with non-flanking guide links that are press fit. This non-flanking guide link (an inner guide) may have an identical configuration to the flanking guide link and also have an aperture configured to match the configuration of the pivot member. In this embodiment, however, the inner guide link will engage a complementary groove on the sprocket to guide the chain. In this embodiment, as well as in the embodiment for use with a continuously variable transmission, the number of inside links in the non-guide row preferably exceeds the number of inside links in the guide row.

The use of guide links which are press fit or interference fit with the pins provides a link with increased fatigue strength, in comparison to a link which is not press fit. The use of fewer links in the guide row than in the non-guide row reduces the contact stresses in the chain.

In a particular embodiment of the inverted tooth or silent chain, the chain includes sets of guide links and sets of inside links with the sets of inside links being interlaced. The sets of guide links include pairs of external or flanking guide links which are located on the outside of the rows or sets of the inside links. Alternatively, the guide links may be internal or non-flanking in which case the sprocket will have a complimentary groove to receive the inner guide link. The guide links are preferably press fit on the pins. That is, the pins are fit within the apertures of the guide links so that the pins do not rotate with respect to the guide links.

The sets of inside links are interlaced so that one set of inside links are in the guide row and are interlaced with another set of inside links that are in the non-guide row. The configuration of the sets of the inside links, exclusive of the aperture configuration, may be the same or different particularly the configuration of the flanks of the toes. Within one set, for example, the set of inside links in the guide row, the configuration of the links, particularly the flanks of the toes, may be the same or different. In this way, some of the links can contact the sprocket teeth on their inside flanks and others can contact the sprocket teeth on their outside flanks.

Preferably, the inside guide row links have an aperture configured to substantially match the cross-section of the pin to prevent rotation of those links with respect to the pin. The inside non-guide row links have an aperture configured to rotate with respect to the pins. The pitch length, however, of the inside non-guide row links is greater than the pitch length of the inside guide row links and the guide links. If it is desired to use the interlaced chain of this embodiment with a sprocket having equally spaced teeth, the rocker radius for the links in the guide row must have a different length than the rocker radius for the links in the non-guide row. Preferably, the difference between the rocker radius of the links in the guide row and the rocker radius of the links in the non-guide row should be one-half the difference between the pitch length of the links in the non-guide row and the links in the guide row. In this way, the distance from the sprocket centerline to a line through the rocker radius centers, which indicates seating of the link on the tooth of the sprocket, will be substantially the same for both the non-guide row links and the guide row links.

The rocker joint of the present invention has use in a timing chain application of inverted tooth links that are laced in a block form. In such a construction, the inside links are substantially identical and placed side-by-side in a row to form a block. Rows or sets of such block laced inside links are preferably alternated with guide link rows. The sets with guide links do not contain any inside links. Similarly, the rocker joint can be used in a continuously variable transmission chain that is laced in block form.

The rocker joint of the present invention also has use in a timing chain or a transmission chain drive application of inverted tooth links that are interlaced. In such a construction, sets of inside links are interlaced so that one set consists of inside links in the guide link row that is interlaced with another set of inside links in the non-guide link row. The configuration of the links may be the same or different.

Use of the single pin rocker joint of the present invention provides several advantages over the use of a round pin chain. The rocker joint provides generally higher efficiencies than the round pin joint with lower wear. Moreover, the single pin rocker joint of the present invention presents advantages over the double-pin rocker joint design of the prior art by its elimination of the additional pin.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 7 is a schematic side view of the inside link and pin illustrating the position of the pin in the link aperture in the straight chain pull position;

FIG. 8 is a schematic side view of the inside link and pin illustrating the position of the pin in the link aperture in the fully articulated position;

FIG. 9 is a schematic side view of the inside link and pin illustrating the position of the pin in the link aperture in the backbend position;

FIG. 10 is a perspective view of a segment of the chain of the present invention for use in a continuously variable transmission, including load block members;

FIG. 11 is a plan view of the chain of the present invention in a block lacing construction;

FIG. 30 is a side view of a link form for another configuration of an inside non-guide row link useful in the embodiment of the chain of FIG. 27;

FIG. 31 is a detail of the aperture of the links of FIGS. 29 and 30;

FIG. 32 is a side view of a link form for one configuration of an inside guide row link useful in the embodiment of the chain of FIG. 27;

FIG. 33 is a side view of a link form for another configuration of an inside guide row link useful in the embodiment of the chain of FIG. 27;

FIG. 34 is a detail of the aperture of the links of FIGS. 32 and 33; and

FIG. 35 is a detail of the cross-section of a pin useful in the embodiment of the chain of FIG. 27.

DETAILED DESCRIPTION OF THE DRAWINGS

Figure 1:
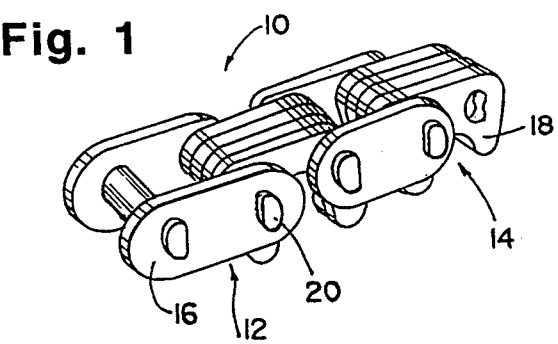
FIG. 1 is a perspective view of a segment of the chain of the present invention, with inverted tooth links and block lacing.

Turning now to the drawings, FIG. 1 illustrates a portion of one embodiment of a power transmission chain generally at 10 using the rocker joint of the present invention. The chain includes sets or rows of interleaved links. In the embodiment of FIG. 1, the chain includes guide link rows 12 interleaved with inside link rows 14. The guide link rows are comprised of external or flanking guide links 16, while the inside link rows are comprised of inside links 18. The guide links 16 are shown more clearly in FIG. 4 and the inside links are shown more clearly in FIG. 2. In this embodiment, the sets of inside links are laced in blocks and the sets of guide links do not include inside links. In another embodiment, shown in FIGS. 19-36, and described in more detail below, the sets of inside links are interlaced with one set of inside links in the guide link row and another set of inside links in the non-guide link row.

The complete chain drive (not shown) includes an endlessly connected chain 10 wrapped about at least a pair of sprockets. The sprockets are mounted on shafts, such as an engine crankshaft or engine camshaft. The sprockets may be of different diameters and may have a different number of differently shaped teeth or may have equally spaced identical teeth. The chain and sprocket system can also include an idler sprocket.

Figure 6:
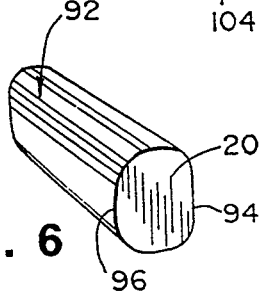
FIG. 6 is a perspective view of the pin of FIG. 5.

The rows or sets of links are formed of a plurality of links placed in side-by-side relationship. The links of the interleaved set are preferably alternated with the links of the first set. The adjacent sets of links are joined by pivot members 20, which are illustrated in FIG. 6 as pins with a flat front working surface and an arcuate back surface. The pivot members are received in aligned sets of apertures 22, 24, 26, 28. Each link preferably includes a pair of apertures located at opposite ends of the link.

In the silent chain embodiments, the flanking guide links 16 maintain the lateral alignment of the chain on the sprockets. The flanking guide links are along the outside of the chain and have no driving engagement with the sprocket teeth. Thus, the guide links are distinguished from the inside links 18, or driving links, by their lack of sprocket tooth contacting members. An inside guide link without sprocket contacting teeth (not shown) may also be used in which case the sprocket is grooved to receive the inside guide link.

The pivot members 20 are shaped for a press fit within the apertures 26, 28 of the guide links. In the silent chain embodiment, the pivot members are typically peened over to maintain the integrity of the chain assembly; however, other methods may be used if desirable. In the embodiments of the present invention which have applications with continuously variable transmissions (CVT), the guide links act to secure the pins. Flanking guide links are placed along the outside of the rows of the chain, while other guide links are press fit on the pins and placed on the inside of the rows of the chain.

Figure 4:
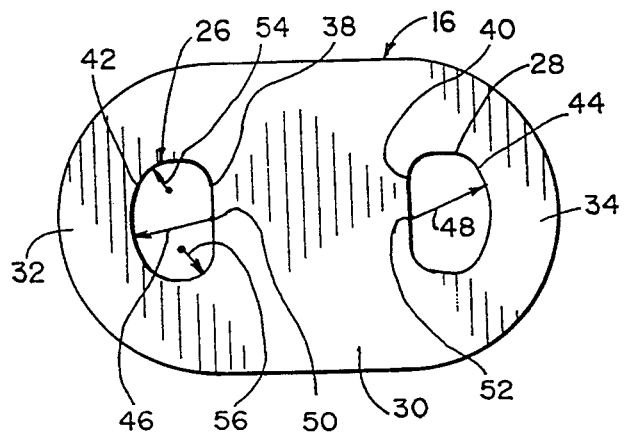
FIG. 4 is a side view of a link form for a guide link used in the chain of the present invention.

The guide links shown in FIG. 4, which lack sprocket tooth contacting members (inverted teeth), are known as flanking guide links. Pairs of flanking guide links are placed on the outside of the chain in the guide rows to maintain the chain on the sprockets. The non-guide rows, which do not have pairs of flanking guide links, have the inside links or inside non-guide row links. The external or flanking guide links are not to be confused with internal, non-flanking guide links, or inside guide row links. The inside guide row links are links that are present in the guide rows. In the silent chain embodiment, the inside guide row links include pairs of inverted teeth that are adapted to contact the teeth of a sprocket. The inside guide row links may also be press fit on the pins in the guide rows. In the CVT embodiment, the inside guide row links include depending tabs which act to form a passageway for a load block.

Figure 2:
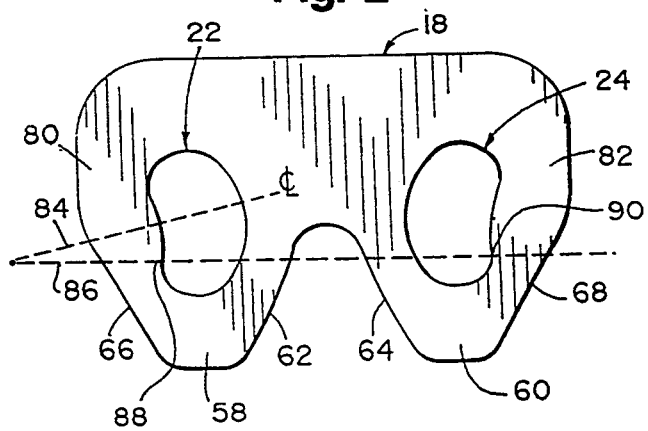
FIG. 2 is a side view of a link form for an inside link used in the chain of the present invention.

In the case where the chain includes inside guide row links, the links may include apertures of the same configuration as the flanking guide links to provide the press fit on the pins. Alternatively, the apertures in the inside guide row links may be slightly larger than the pivot members so that there is a close fit between the pin and the aperture. Thus, when the inside link of FIG. 2 is positioned in the guide row as an inside guide row link, the link 18 may have apertures 26, 28 of the configuration shown in FIGS. 4 and 5.

The flanking guide link 16 is illustrated in FIG. 4. The guide link 16 is defined by body portion 30 and end portions 32, 34. The guide link apertures have substantially flat surfaces 38, 40, which are both oriented toward the inside body portion 30 of the link. The back surfaces 42, 44 of the apertures are formed by radii 46, 48, which are struck from center points 50, 52. The radii center points 50, 52 are preferably located between the apertures 26, 28, within the body portion of the link. The apertures each contain additional connecting arcs with connecting radii 54, 56, which are shown only for aperture 26. The pitch of the guide link is measured as the distance between the flat surfaces 38, 40 of the apertures, along the pitch line of the link.

Figure 3:
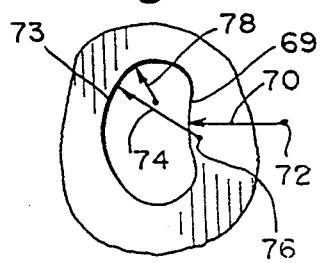
FIG. 3 is a detail of the aperture of the link of FIG. 2.

Inside links 18 are interleaved with the guide links 16. Link 18 is illustrated in FIG. 2 and is defined by a pair of spaced toes 58, 60. The toes are defined by inside flanks 62, 64 and outside flanks 66, 68. The apertures are defined by a plurality of arcs, which are more clearly shown in the detail of FIG. 3. The front surface 69 is formed by an arc of radius 70 which is struck from centerpoint 72. The back surface 73 is formed by an arc of radius 74 which is struck from centerpoint 76. The connecting surfaces 77 are formed by a plurality of arcs, such as the arc struck from radius 78. The radii centerpoints of the apertures of the inside link are preferably located on opposite sides of the apertures, toward the end portions 80, 82 of the link.

The apertures of the inside links are each preferably symmetrical about a centerline. The centerline 84 is shown for the left aperture 22. The right aperture 24 has a similar symmetrical centerline (not shown). The apertures are rotated about the pitch line 86 of the link to form a positive tilt angle.

The preferred aperture tilt angle of the inside link is approximately 6 degrees, which is the angle between the symmetrical centerline and the pitch line of the link. This is in contrast to the guide links 16 which have zero aperture tilt. The pitch length of the inside links is measured along the pitch line, between the points of intersection 88, 90 of the apertures with the pitch line. The pitch points 88, 90 are the points of vertical tangency of the aperture inside front surface. The location of the pitch line in the link is determined by the link tooth form as well as the design of the sprocket. The pitch length of the inside link is greater than the pitch length of the guide link.

Figure 5:
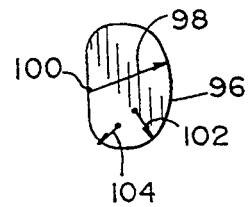
FIG. 5 is a detail of the cross-section of a pin used in the chain of the present invention.

The pin 20 is illustrated in FIG. 6, with the detail of the cross section shown in FIG. 5. The pin includes a body portion 92, which has a substantially flat front working surface 94 and arcuate back surface 96. The back surface 96 is constructed of arcs formed by a plurality of radii. These radii include radius 98, struck from centerpoint 100 and radii 102, 104.

In operation, the movement of the pin 20 of the rocker joint of the silent chain embodiment relative to the links of the chain, is illustrated in FIGS. 7, 8, and 9. FIG. 7 illustrates the pin in the straight-pull position of the chain. In such a position, the chain is extended between two sprockets and the link is being viewed in the tight strand portion of the chain. The rocking contact of the fiat front surface of the pin occurs with the front arcuate portion of the aperture at contact point 110. In the straight-pull position of FIG. 7, the rocking contact points are the points of vertical tangency 88, 90, shown in FIG. 2. The rocking occurs along a portion of the fiat surface of the pin as a rolling type action. This rolling action is in contrast to the sliding of a round pin within a round aperture of a round pin joint. A small pin-to-aperture clearance is provided at point 112, which is opposite the side of the rocking contact point 110. The minimal clearance at point 112 between the back surface 96 of the pin and the back surface 73 of the aperture allows substantially free movement of the back surface of the pin relative to the link, as the chain articulates. In the straight-pull position, clearance between the pin and aperture on the back surfaces is provided in the tight strand of the chain.

The pin 20 moves relative to the link to the position shown in FIG. 8, where the link is fully articulated. In the fully articulated position, the chain has wrapped around the sprocket and the link is being viewed in a position of being fully seated in the sprocket. Preferably, a minimum clearance between the back surface of the pin and the aperture surface is maintained in this position.

In a timing chain drive application, the chain is provided with a back-bending or flexing ability. In such a motion, the pin 20 moves relative to the link to the position shown in FIG. 9. In this position, the slack side of the chain has been forced to an inward position by a chain snubber and the link is being viewed in the fullest position of backbending.

In one silent chain embodiment, the chain of the present invention is constructed with a block lacing. Such a block lacing is illustrated in FIG. 11. An example of block lacing in silent chain for an engine timing drive is also shown in U.S. Pat. No. 4,759,740. The inside links are substantially identical and placed side-by-side in the row to form a block. Rows or sets of such block laced inside links are preferably alternated with guide link rows. The sets of guide links do not contain any sprocket tooth contacting members. That is, they do not contain any links with depending teeth for sprocket tooth contact.

In the block laced construction, the curved portion of the apertures of the inside links in the block act together to form a continuous curved surface, which is substantially continuous across the width of the chain, for rocking contact with the pin. The inside curved surface of the apertures of the block laced links therefore, effectively, forms a rocker for rocking action against the pin.

The block construction also allows use of the single pin with a single type of inside link. Without the block lacing construction, inside links would be present in the guide link row. To place inside links in the guide row requires a second type of inside link, with the apertures reversed in direction, to permit lacing of the chain. Alternatively, as described above, the inside links may be placed in the guide row as non-flanking guide links or inside guide row links, as will be more fully described below. These inside guide row links may be press fit on the pin or may have an aperture slightly larger than the pin to prevent rotation of the pin with respect to the link. The press fit is achieved by utilizing the same configuration aperture in the inside guide row link as in the flanking guide link, which matches the configuration of the pin. The inside guide row links have a pair of depending toes adapted to contact the teeth of a sprocket. In this embodiment, the number of inside links in the non-guide row preferably exceeds the number of inside links in the guide row.

The use of inside guide row links which are press fit or interference fit with the pins provides a link with increased fatigue strength, in comparison to a link which is not press fit. The use of a greater number of inside links in the non-guide row than in the guide row also reduces the contact stresses in the chain.

The use of the single pin rocker joint of the present invention in the block lacing construction combines the benefits of the block lacing with the benefits of a rocker pin joint. The rocker joint is generally of higher efficiency than a round pin joint of comparable size and has generally lower wear characteristics.

The single pin rocker joint of the present invention can be used with a silent chain, as described, or also with a chain used for a continuously variable transmission (CVT). An example of a portion of such a chain is shown in FIG. 10. In such a chain, the power transfer occurs through load block members 110 that either encircle the links or are placed in a passageway beneath the links. The chain in FIG. 10 includes the single pin 105 with the guide links 101 and inside links 103. The inside links in the guide row require apertures that are larger than the apertures in the flanking guide links in order to permit articulation of the links with respect to the pins. The inside link apertures in the guide row would also be in the opposite directions of the apertures of the inside link apertures in the non-guide row. Alternatively, the internal links in the guide row (non-flanking guide links) have apertures of the same shape as the cross-section of the pins. The internal links are preferably not block laced in order to provide support for the load block 110. An example of a power transmission chain for use in a continuously variable transmission, with load block members encircling the links, is shown in U.S. Pat. No. 4,507,106. Alternatively, the power transfer can occur through the pins that contact the pulley sheaves.

Figure 12:
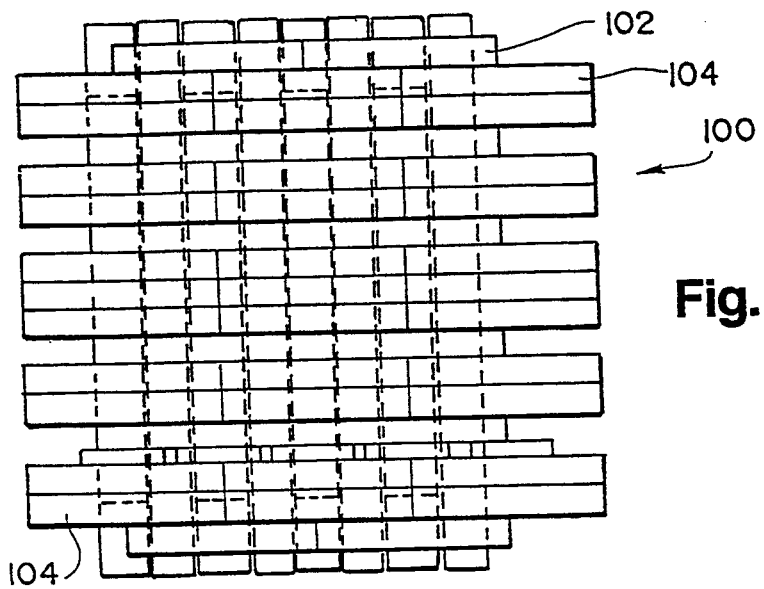
FIG. 12 is a plan view of an embodiment of the chain of the present invention for use in a continuously variable transmission.
Figure 13:
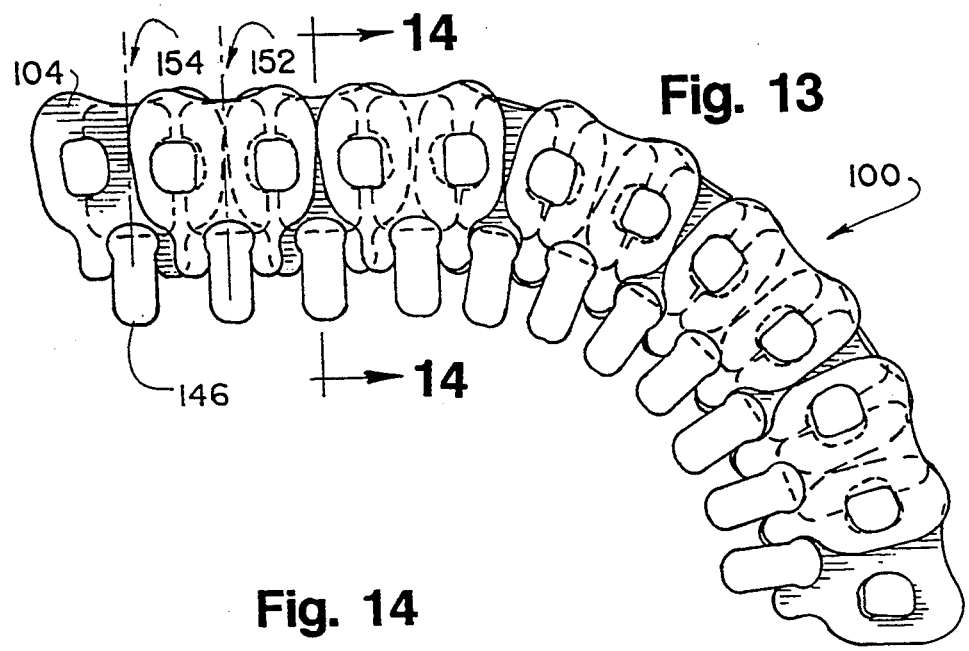
FIG. 13 is a side view of the embodiment of FIG. 12.
Figure 14:
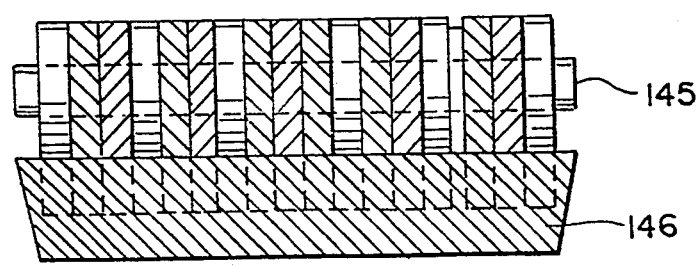
FIG. 14 is cross-sectional view taken along line 14—14 of FIG. 13.

FIGS. 12, 13 and 14 also illustrate the rocker joint in a power transmission chain for a continuously variable transmission. An example of this type of chain is described in U.S. Pat. No. 5,007,883, which is incorporated herein by reference. The chain 100, or chain-belt, includes a plurality of interleaved or laced sets of links 102, 104. Each link has a pair of spaced apertures 106, 108. The apertures are arranged so that a pivot members in the form of a single pin can join adjacent links to permit the chain to articulate. On account of the lacing, different sets of links may have different numbers of links.

Figure 15:
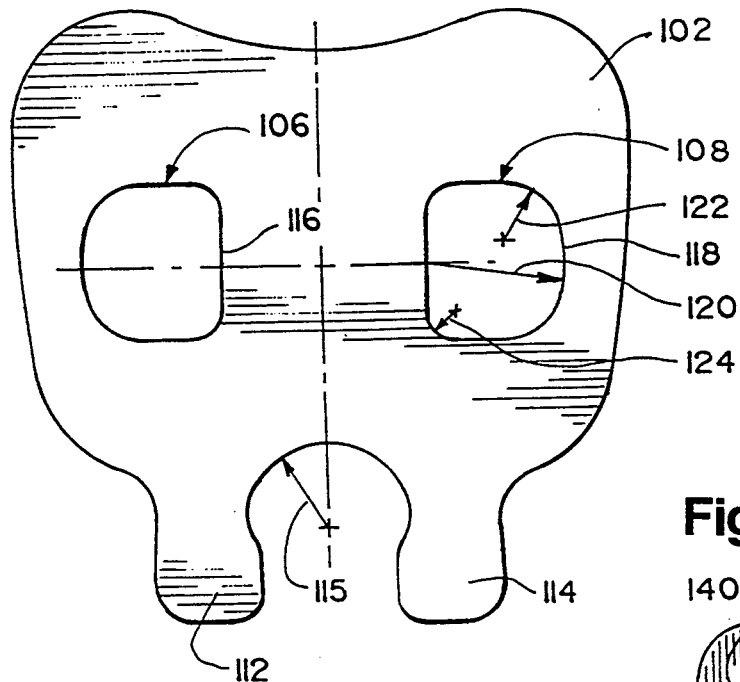
FIG. 15 is a partial elevation of a guide row link of the embodiment of FIG. 12.
Figure 16:
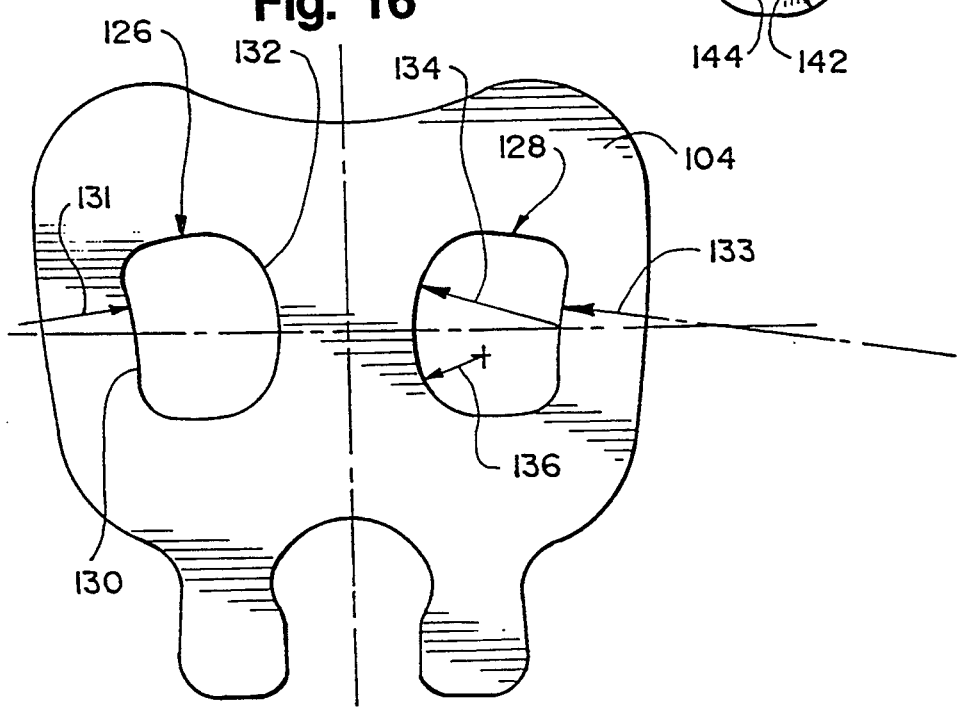
FIG. 16 is a partial elevation of a inside row link of the embodiment of FIG. 12.

The links are illustrated in detail in FIGS. 15 and 16. Each link 102 has a pair of toes 112, 114 which are downwardly disposed in a direction toward the shafts of the transmission. The toes are spaced apart and positioned to define a passageway therebetween formed by radius 115. FIG. 15 illustrates the links located in the guide row. The guide row links include apertures 106, 108 that have substantially the same shape as the cross-sectional configuration of the pin, thereby preventing rotation of the link relative to the pin. The guide row links are therefore press fit or interference fit on the pins. The apertures have a substantially straight front surface 116 and a back surface 118 that is formed by a plurality of radii 120, 122. Blend radii 124 join the front and back surfaces.

FIG. 16 illustrates the links 104 located in the non-guide row. The non-guide row links, or inside links, include apertures shaped to allow rotation of the links with respect to the pins. The apertures 126, 128 include a convexly curved front surface 130 and a curved back surface 132. The back surface is formed by radius 134 and blend radii 136. The front surfaces are formed by radii 131, 133. The apertures have a positive tilt angle with respect to the horizontal. The convex front surface is only slightly arcuate. The front surface of the pin rocks against the arcuate front surface of the inside link aperture to form the rocker joint. The centers of curvature of the radii 131, 133 of the front surfaces are on opposite sides of the apertures.

Figure 17:
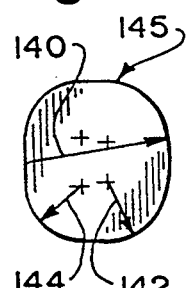
FIG. 17 is a detail of the cross-section of the pin used in the chain of FIG. 12.

The pivot members are preferably in the form of pins, similar to the pin illustrated in FIG. 6. The cross-section of the pin is substantially the same as the aperture of the guide row links. The pin 145 is shown in FIG. 17, and has a back surface formed by radius 140, and radii 142, 144.

A load block 146 is associated with each set of links and is received in the passageway. The upper region of the load block has the same shape as the passageway but is only slightly smaller in size to allow the load blocks to be positioned in the passageway. The load blocks have a lower portion that extends from the passageway and has ends that are designed to engage the flanges of the pulleys of the continuously variable transmission. The load blocks are preferably formed of solid metal.

FIGS. 12 and 14 illustrate the lacing of the guide row and non-guide row links in the chain. The lacing pattern includes fewer links in the guide rows 152 than in the non-guide rows 154. This lacing decreases the contact stresses in the chain. As shown in FIGS. 12 and 14, the load blocks have a groove or notch 148 in one end. The notch is located in the block and serves to position a retaining link. The retaining link and notch serve to restrain any movement of the links in a direction transverse to the travel of the chain.

The guide rows include both external (flanking) guide links and internal (non-flanking) guide links. The non-guide rows include inside links. The guide links are press fit on the pins while the inside links rotate with respect to the pins, and form the single pin rocker joint. Unlike the silent chain joint, the CVT chain joint of FIGS. 12-14 does not allow substantial back-bending of the chain.

Figure 18:
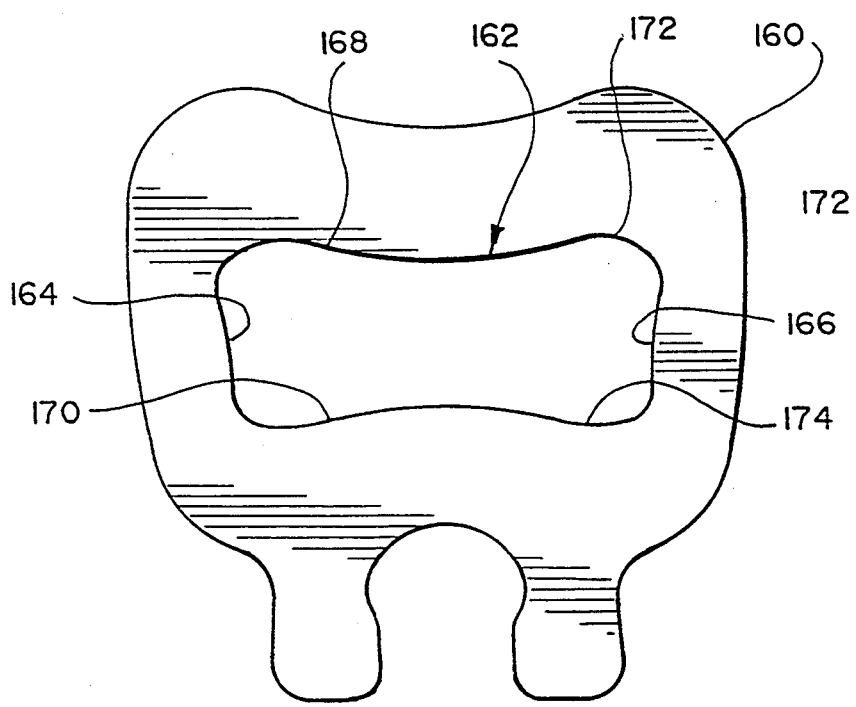
FIG. 18 is a side view of an alternate embodiment of an inside link of the chain of FIG. 12.

FIG. 18 illustrates an alternate embodiment of the inside link of the chain of FIG. 12. The link 160 includes a large central aperture 162. The aperture 162 includes a pair of back surfaces 164, 166 that permit rotation of the pins against the back surfaces. The large central aperture combines the two separate apertures of the link of FIG. 15. The aperture includes surfaces 168, 170, 172, 174 which are constructed to retain the pins in position to rock against the aperture back surfaces.

The combination of the rocker joint of the present chain with other types of chain and configurations of links is also possible. For example, the single pin rocker joint can be used in silent chain in which the configuration of the links, particularly the configuration of the flanks of the toes, is mixed.

Figure 19:
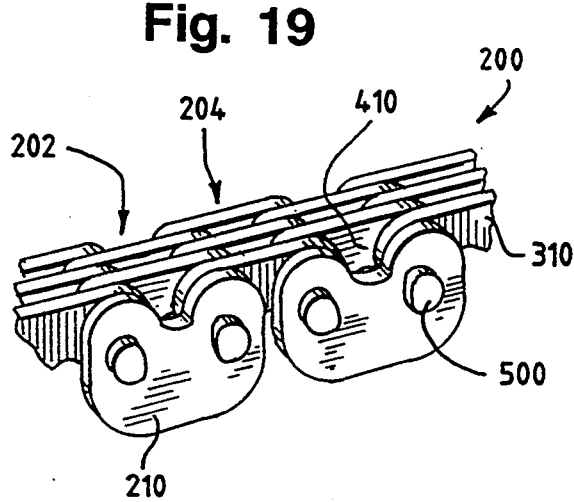
FIG. 19 is a perspective view of a segment of another embodiment of the chain of the present invention with inverted tooth links that are interlaced.
Figure 21A:
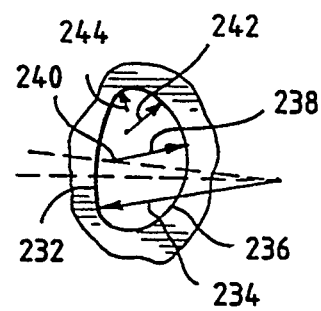
FIG. 21 is a side view of a link form for a guide link useful in the embodiment of the chain of FIG. 19.

In addition, the single pin rocker joint can be used with a silent chain that has inside links that are interlaced. FIG. 19 illustrates one embodiment of a silent chain shown generally at 200 using the rocker joint of the present invention. The chain in FIG. 19 includes adjacent guide link rows 202 and non-guide link rows 204 with flanking guide links interleaved with sets of inside links. The sets of inside links include inside guide row links 410, that have their apertures aligned with the apertures of the guide link 210, and inside non-guide row links 310 interlaced with the inside guide row links 410. The lacing pattern includes fewer inside links in the guide rows than in the non-guide rows. This lacing pattern decreases the contact stresses in the chain.

The configuration of the inside guide row links 410 and the inside non-guide row links 310, exclusive of the apertures, may be the same or different. In addition, the configuration of each of the inside links within the guide row may be the same or different. In particular, the configuration of the flanks of the toes may be different, as best seen in FIGS. 32 and 33. Likewise, the configuration of each of the inside links within the non-guide row may be the same or different.

Figure 26:
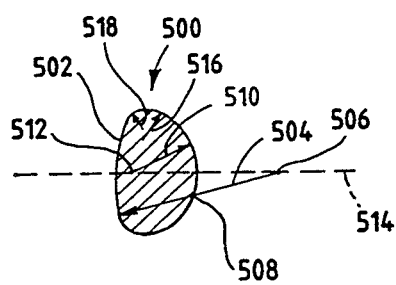
FIG. 26 is a detail of the cross-section of a pin useful in the embodiment of the chain of FIG. 19.
Figure 27:
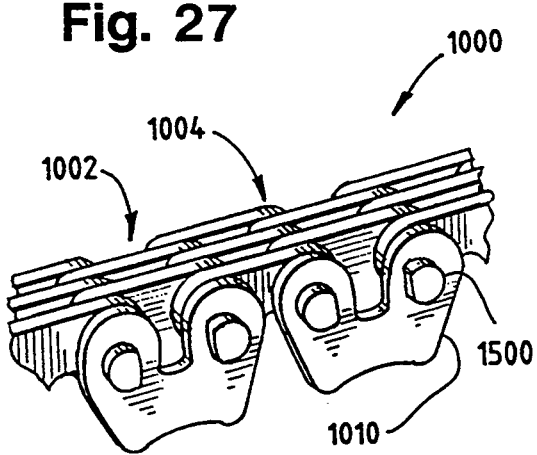
FIG. 27 is a perspective view of a segment of another embodiment of the chain of the present invention with inverted tooth links that are interlaced and have different configurations.

The adjacent sets of inside guide row links and inside non-guide row links are joined by pivot members 500 that are illustrated in FIG. 26 as pins with a front working surface 502 and an arcuate back surface 508. The pivot members are received in aligned sets of apertures. Each link preferably includes a pair of apertures located at opposite ends of the link. Since it is preferred to have one row of links articulate with respect to another row, the inside guide row links 410 have an aperture with substantially the same configuration as the pivot member to prevent rotation of the pivot member with respect to the link.

Figure 21:
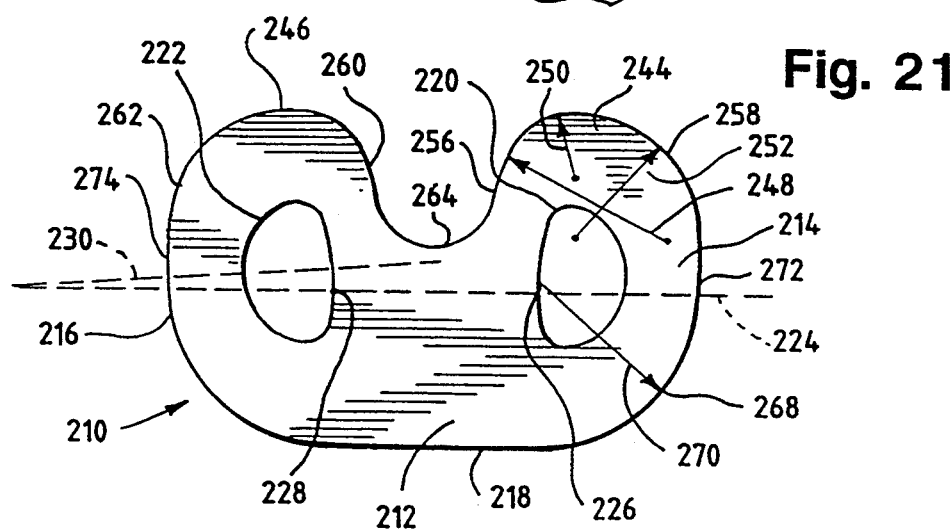

The guide links may have any suitable configuration such as that shown in FIG. 4. Preferably, the guide link has a configuration as shown in FIG. 21. More preferably, the guide link has a configuration and construction so that it has a yield load less than the yield load of the inside links, as more fully described in U.S. application Ser. No. 08/196,310 filed Feb. 15, 1994 (Attorney Docket No. 93003) titled Chain Guide Link, assigned to the assignee of the present application and fried together with the present application and which is incorporated herein by reference.

Referring particularly to FIG. 21, the guide link 210 is defined by a body portion 212 and end portions 214, 216 and has a fiat bottom 218 and a pair of spaced apertures 220, 222 surrounded by a pair of upward extending toes 244, 246. The toes are preferably rounded and are formed by connecting arcs having radii 248, 250, 252 which are only shown for one toe. The toes are defined by inside flanks 256, 260 and outside flanks 258, 262 with the inside flanks joined at a crotch 264 that is preferably rounded. The bottom of the guide link is joined to the sides 270, 272 through a rounded comer 266 formed by a radius 268 which is shown for only one corner. The sides are joined with the outside flanks at the end portions through an arc formed by radius 252 with its centerpoint 254 located within the aperture.

The apertures 220, 222 are provided between the crotch and the end portions of the link. The apertures are provided on a horizontal pitch line 224 and each are preferably symmetrical about a centerline 230. The centerline is shown for one aperture. The other aperture has a similar centerline (not shown). The apertures are rotated about the pitch line to form a positive tilt angle. The preferred aperture tilt angle of the flanking guide link is approximately three degrees, which is the angle between the symmetrical centerline and the pitch line of the link. The pitch length of the guide link is measured along the pitch line, between the points of intersection of the apertures with the pitch line. The pitch points 226, 228 are the points of vertical tangency of the aperture inside front surface 232.

The apertures have a front surface 232 that is oriented toward the inside body portion 212 of the link and a back surface 236 oriented toward the end portions of the link. The front surface 232 has a small curvature formed by an arc of a radius 234 that is struck from a centerpoint located on the intersection of the pitch line and the symmetrical centerline. This radius is referred to as the rocker radius for the guide link. The back surface 236 of the apertures is formed by a radius 238 (shown only for one aperture) that is struck from a centerpoint located on the symmetrical centerline within the aperture. The apertures each contain additional connecting arcs with connecting radii 240, 242, at least one of which is a blending radius 242 that joins the front surface and the back surface.

Figure 22:
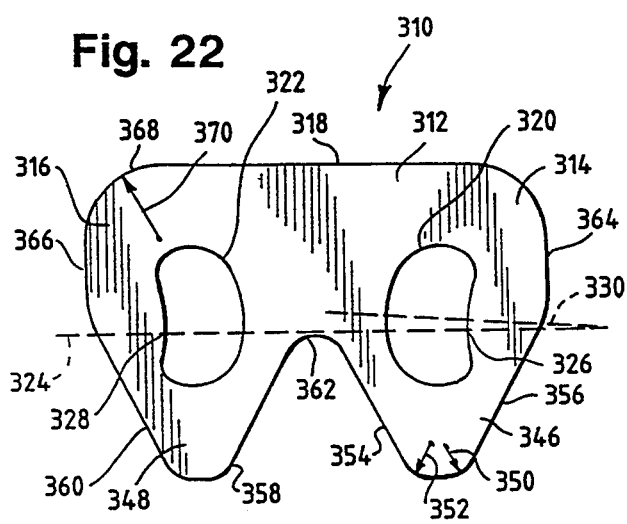
FIG. 22 is a side view of a link form for an inside non-guide row link useful in the embodiment of the chain of FIG. 19.

One embodiment of the inside non-guide row link is illustrated in FIG. 22. The link form illustrated in FIG. 2, as well as other link forms contemplated by those skilled in the art may also be used. The inside non-guide row link 310 of FIG. 22 is defined by a body portion 312 and end portions 314, 316 and has a top 318 and a pair of spaced apertures 320, 322 surrounded by a pair of downward extending spaced toes 346, 348 adapted to contact the teeth of a sprocket. The toes are preferably rounded and are formed by connecting arcs having radii 350, 352 which are only shown for one toe. The toes are defined by inside flanks 354, 358, and by outside flanks 356, 360 with the inside flanks joined at a crotch 362 that is preferably rounded. The top of the link is joined to substantially vertical sides 364, 366 through a rounded corner 368 formed by a radius 370 which is shown for only one corner. The sides are joined with the outside flanks at the end portions.

Figure 23:
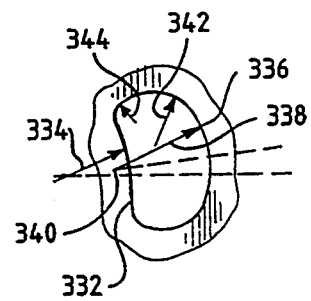
FIG. 23 is a detail of the aperture of the link of FIG. 22.

The apertures 320, 322 are provided between the crotch and the end portions of the link and are defined by a plurality of arcs, which are more clearly shown in FIG. 23. The apertures 320, 322 are provided on a horizontal pitch line 324 and are each preferably symmetrical about a centerline 330. The centerline is shown for one of the apertures. The other aperture has a similar symmetrical centerline (not shown). The apertures are rotated about the pitch line to form a positive tilt angle. The preferred aperture tilt angle is approximately three degrees, which is the angle between the symmetrical centerline and the pitch line of the link. The pitch length of the inside non-guide row link is measured along the pitch line, between the points of intersection of the apertures with the pitch line. The pitch points 326, 328 are the points of vertical tangency of the aperture inside front surface. The location of the pitch line in the link is determined by the link tooth form as well as the design of the sprocket. The pitch length of the inside non-guide row links is greater than the pitch length of the guide links.

The apertures have a convexly curved front surface 332 that is oriented toward the end portion of the link and a curved back surface 336 oriented toward the inside body portion of the link. The curved front surface is formed by an arc of a radius 334 that is struck from a centerpoint located on the intersection of the pitch line and the symmetrical centerline. This radius is referred to as the rocker radius for the non-guide row link. The back surface 336 of the aperture is formed by an arc of a radius 338 (shown for only one aperture) that is struck from the centerpoint 340 located above the symmetrical centerline within the aperture. The apertures each contain additional connecting arcs with connecting radii 342, 344, at least one of which is a blending radius that joins the front surface and the back surface.

Figure 24:
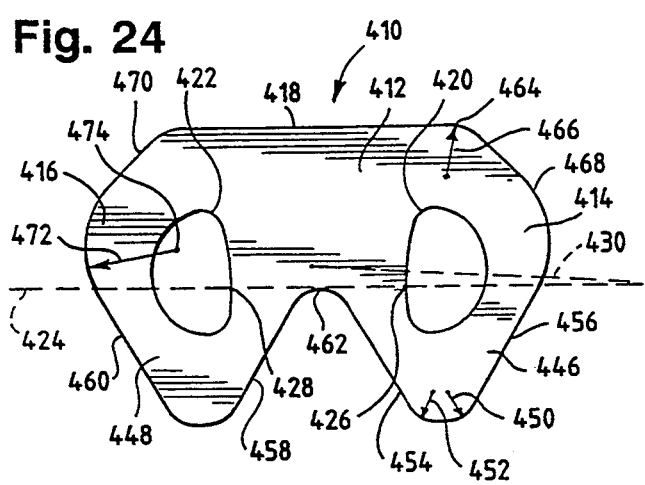
FIG. 24 is a side view of a link form for an inside guide row link useful in the embodiment of the chain of FIG. 19.

One embodiment of the inside guide row link is illustrated in FIG. 24. The link forms illustrated in FIGS. 4 and 22 as well as other link forms contemplated by those skilled in the art may also be used. The inside guide row link 410 of FIG. 24 is defined by a body portion 412 and end portions 414, 416 and has a top 418 and a pair of spaced apertures 420, 422 surrounded by a pair of spaced toes 446, 448. The toes are preferably rounded and are formed by connecting arcs having connecting radii 450, 452 which are shown for only one toe. The toes are defined by inside flanks 454, 458 and by outside flanks 456, 460 with the inside links joined at a crotch 462 that is preferably rounded. The top of the link is joined to sides 468, 470, that are preferably angled outward, through a rounded corner 464 formed by a radius 466 which is shown for only one corner. The sides are joined with the outside flanks at the end portions through an arc formed by a radius 472 having its centerpoint 474 in the aperture.

Figure 25:
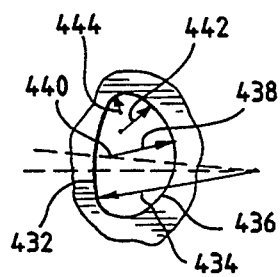
FIG. 25 is a detail of the aperture of the link of FIG. 24.

The apertures are provided between the crotch and the end portions of the link and are defined by a plurality of arcs, which are more clearly shown in FIG. 25. The configuration of the aperture may be identical to the aperture in the links of the non-guide row, except reversed so that the links can be laced. Preferably, however, the configuration of the aperture of the inside guide row link is substantially the same as the flanking guide links and, as a result, is substantially the same as the pivot member. The configuration may be such that the inside guide row link is press fit onto the pin. Preferably, the configuration is such that the cross-section of the aperture is slightly greater than the pin so that the pin is interference fit into the aperture. In this way, the inside guide row links are prevented from rotating with respect to the pin. As a result, the set of inside non-guide row links will articulate with respect to the inside guide row links and guide links.

The apertures 420, 422 of the inside guide row links are provided on a horizontal pitch line 424 and are each preferably symmetrical about a centerline 430. The centerline is shown for one of the apertures. The other aperture has a similar symmetrical centerline (not shown). The apertures are rotated about the pitch line to form a positive tilt angle. The preferred aperture tilt angle is approximately three degrees, which is the angle between the symmetrical centerline and the pitch line of the link. The pitch length of the inside guide row link is measured along the pitch line, between the points of intersection of the front surfaces of the apertures with the pitch line. The pitch points 426, 428 are the points of vertical tangency of the aperture inside front surface. The pitch length of the inside guide row link is smaller than the pitch length of the inside non-guide row link.

In particular, the apertures 420, 422 have a front surface 432 that is oriented toward the inside body portion of the link and a back surface 436 oriented toward the end portions of the link best seen in FIG. 25. The front surface 432 has a small curvature formed by an arc of a radius 434 that is struck from a centerpoint located on the intersection of the pitch line and the symmetrical centerline. This radius is referred to as the rocker radius for the inside guide row link. The rocker radius 434 for the inside guide row link is greater than the rocker radius 334 for the inside non-guide row link.

The back surface 436 of the apertures is formed by an arc of a radius 438 struck from a centerpoint 440 located on the symmetrical centerline within the aperture. The aperture contains additional connecting arcs with connecting radii 442, 444 at least one of which is a blending radius that joins the front surface and back surface.

The cross section of the pivot member is illustrated in FIG. 26. The pivot member is preferably a pin that includes a body portion that has a front working surface 502 with a small curvature that has substantially the same radius as the guide link and the inside guide row link and an arcuate back surface 508. The back surface is constructed of an arc having a radius 510 with a centerpoint 512 within the body of the pin on the horizontal centerline 514. The pin contains additional connecting arcs formed from connecting radii 516, 518 at least one of which is a blending radius that joins the back surface to the front surface.

Although some features of the inside guide row links and the inside non-guide finks differ, in this embodiment the flanks of each are preferably substantially the same so that both links contact the sprocket teeth in the same manner. As noted above, however, the rocker joint of the present invention can be used in a silent chain in which the flank configuration of the inside links is mixed. One example of a silent chain with mixed inside link configuration is shown and described in U.S. Pat. No. 4,342,560 referred to above and incorporated herein by reference. FIGS. 27-35 illustrate another embodiment of a silent chain shown generally at 1000 using the rocker joint of the present invention wherein the flank configuration of at least some of the inside links are different. More particularly, at least some inside links in the guide row 1002 have a different flank configuration. Likewise, at least some of the inside links in the non-guide row 1004 have a different flank configuration. In the embodiment illustrated in FIGS. 27-35, the inside links of the guide row and the non-guide row include two different link configurations.

Figure 28A:
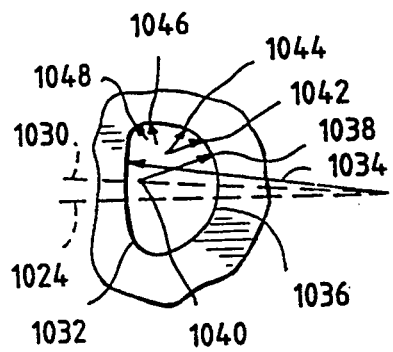
FIG. 28 is a side view of a link form for a guide link useful in the embodiment of the chain of FIG. 27.
Figure 28:
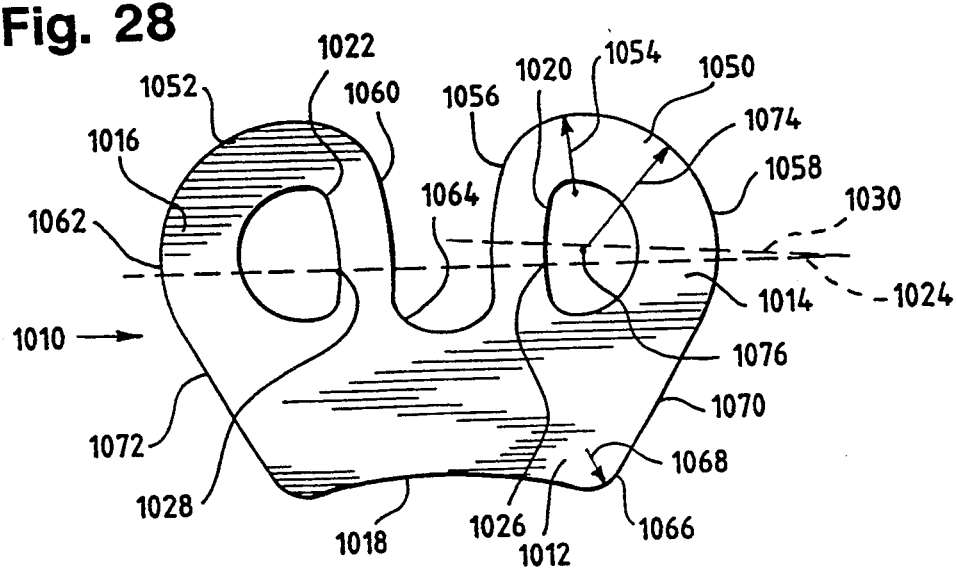

The guide links may have any suitable configuration such as that shown in FIGS. 4 and 21. Preferably, the guide link has a configuration as shown in FIG. 28. More preferably, the guide link has a configuration and construction so that it has a yield load less than the yield load of the inside links, as more fully described in U.S. application Ser. No. 08/196,310 filed Feb. 15, 1994 (Attorney Docket No. 93003) titled Chain Guide Link, Assigned to the Assignee of the present application and fried on the same day as the present application and which is incorporated herein by reference.

The guide link 1010 of FIG. 28 is defined by a body portion 1012 and end portions 1014, 1016 and has a slightly concave bottom 1018 and a pair of spaced apertures 1020, 1022 surrounded by a pair of upward extending toes 1050, 1052. The toes are preferably rounded and are formed by an arc having a radius 1054 which is only shown for one toe. The toes are defined by inside flanks 1056, 1060 and outside flanks 1058, 1062 with the inside flanks joined at a crotch 1064 that is preferably rounded. The root of the crotch extends below the centerline of the apertures and preferably below the apertures. The bottom 1018 of the guide link is joined to the sides 1070, 1072 through a rounded corner 1066 formed by a radius 1068 which is shown for only one corner. The sides are tapered outward from the bottom and are joined with the outside flanks at the end portions through an arc formed by radius 1074 having its centerpoint 1076 within the aperture.

The apertures 1020, 1022 are provided between the crotch and the end portions of the link. The apertures are provided on a horizontal pitch line 1024 and each are preferably symmetrical about a centerline 1030. The centerline is shown for one aperture. The other aperture has a similar centerline (not shown). The apertures are rotated about the pitch line to form a positive tilt angle. The preferred aperture tilt angle of the flanking guide link is approximately three degrees, which is the angle between the symmetrical centerline and the pitch line of the link. The pitch length of the guide link is measured along the pitch line, between the points of intersection of the apertures with the pitch line. The pitch points 1026, 1028 are the points of vertical tangency of the aperture front surface.

The apertures have a front surface 1032 that is oriented toward the inside body portion of the link and a back surface 1036 oriented toward the end portions of the link. The front surface has a small curvature formed by an arc of a radius 1034 that is struck from centerpoint located on the intersection of the pitch line and the symmetrical centerline. The radius is referred to as the rocker radius for the guide link. The back surface 1036 of the apertures is formed by a radius 1038 (shown only for one aperture) that is struck from the centerpoint 1040 located on the symmetrical centerline within the aperture. The apertures each contain additional connecting arcs with connecting radii 1042, 1044, 1046, 1048, at least one of which is a blending radius to join the flat surface and the back surface.

The configuration of the inside non-guide row links may take many forms including the form illustrated in FIGS. 2 and 22 as well as other link forms contemplated by those skilled in the art. Preferably, the inside links in the non-guide row have at least two different configurations, as best illustrated in FIGS. 29 and 30.

Figure 29:
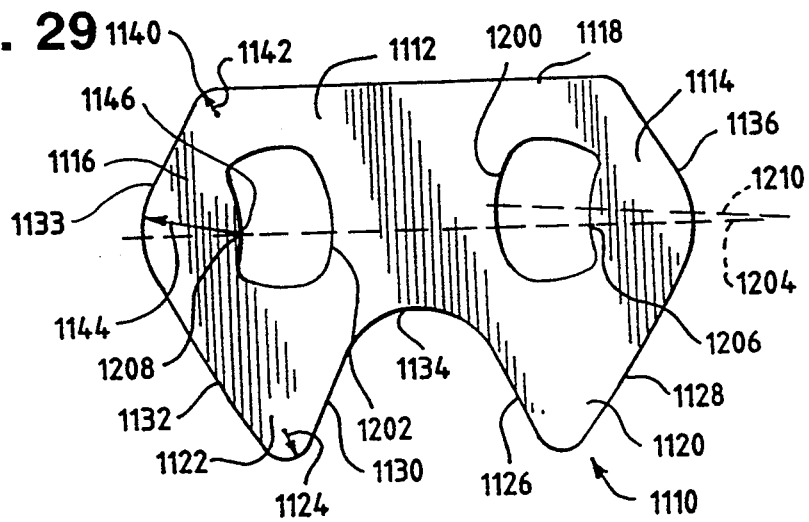
FIG. 29 is a side view of a link form for one configuration of an inside non-guide row link useful in the embodiment of the chain of FIG. 27.

The inside non-guide row link 1110 of FIG. 29 is defined by a body portion 1112 and end portions 1114, 1116 and has a top 1118 and a pair of spaced apertures 1200, 1202 surrounded by a pair of spaced toes 1120, 1122. The toes are preferably rounded and are formed by a connecting arc having a radius 1124 which is shown for one toe. The toes are defined by inside flanks 1126, 1130 and by outside flanks 1128, 1132 with the inside flanks joined at a crotch 1134 that is preferably rounded. The top of the link is joined to sides 1136, 1138 that are preferably angled outward through a rounded corner 1140 formed by a radius 1142 which is shown for only one corner. The sides are joined with the outside flanks at the end portions through an arc formed by a radius 1144 having its centerpoint 1146 on the front surface of the aperture.

The inside non-guide row link 1150 of FIG. 30 is defined by a body portion 1152 and end portions 1154, 1156 and has a top 1158 and a pair of spaced apertures 1200, 1202 surrounded by a pair of spaced toes 1160, 1162. The toes are preferably rounded and are formed by a connecting arc having a radius 1164 which is shown for one toe. The toes are defined by inside flanks 1166, 1170 and by outside flanks 1168, 1172 with the inside flanks joined at a crotch 1174 that is preferably rounded. The inside flanks of the link 1150 subtend an angle that is greater than angle subtended by the inside flanks for the link 1110 illustrated in FIG. 29. As a result, the link 1110 of FIG. 29 contacts the sprocket on the outside flanks whereas the link 1150 of FIG. 30 contacts the sprocket on the inside flanks, i.e., within the crotch. The top of the link is joined to rounded sides 1176, 1178 defined by an arc formed by a radius 1180 having its centerpoint 1182 in the aperture. The sides are joined with the outside flanks at the end portions.

Since it is preferred that the inside links of the non-guide row rock with respect to the pivot member, the configuration of the apertures is identical for each configuration of link 1110, 1150 shown in FIGS. 29 and 30. The apertures 1200, 1202 are defined by a plurality of arcs, which are more clearly shown in FIG. 31.

The apertures of the inside non-guide row links are provided on a horizontal pitch line 1204 and are each preferably symmetrical about a centerline 1206. The centerline is shown for one of the apertures. The other aperture has a similar symmetrical centerline (not shown). The apertures are rotated about the pitch fine to form a positive tilt angle. The preferred aperture tilt angle is approximately three degrees, which is the angle between the symmetrical centerline and the pitch line of the link. The pitch length of the inside non-guide row link is measured along the pitch line, between the points of intersection of the apertures with the pitch line. The pitch points 1206, 1208 are the points of vertical tangency of the aperture inside front surface. The location of the pitch line in the link is determined by the link tooth form as well as the design of the sprocket.

The apertures have a convexly curved front surface 1212 oriented toward the end portion of the link and a curved back surface 1216 oriented toward the inside body portion of the link. The curved front surface 1212 is formed by an arc of a radius 1214 that is struck from a centerpoint located on the intersection of the pitch line and the symmetrical centerline. This radius is referred to as the rocker radius for the non-guide row link. The back surface 1216 of the aperture is formed by an arc of a radius 1218 (shown for only one aperture) that is struck from the centerpoint 1220 located on the symmetrical centerline outside of the aperture toward the end portion of the link. The apertures each contain additional connecting arcs with connecting radii 1222, 1224, at least one of which is a blending radius that joins the front surface and the back surface.

The configuration of the inside guide row links may take many forms including the forms illustrated in FIGS. 4 and 24 as well as other link forms contemplated by those skilled in the art. Preferably, the inside links in the non-guide row have at least two different configurations, as best illustrated in FIGS. 32 and 33. Upon comparing the link configurations illustrated in FIGS. 29 and 30 with those illustrated in FIGS. 32 and 33, it will be understood by one skilled in the art, that exclusive of the aperture configuration, the link configuration illustrated in FIG. 32 is identical to the link configuration illustrated in FIG. 29 and described above. Likewise, the link configuration illustrated in FIG. 33 is identical to the link configuration illustrated in FIG. 30 and described above.

The inside guide row link 1310 of FIG. 32 is defined by a body portion 1312 and end portions 1314, 1316 and has a top 1318 and a pair of spaced apertures 1400, 1402 surrounded by a pair of spaced toes 1320, 1322. The toes are preferably rounded and are formed by a connecting are having a radius 1324 which is shown for one toe. The toes am defined by inside flanks 1326, 1330 and by outside flanks 1328, 1332 with the inside flanks joined at a crotch 1334 that is preferably rounded. The top of the link is joined to the sides 1336, 1338, that are preferably angled outward, through a rounded comer 1340 formed by a radius 1342 which is shown for only one comer. The sides are joined with the outside flanks at the end portions through an arc formed by a radius having its centerpoint 1346 on the front surface of the aperture.

The inside non-guide row link 1350 of FIG. 33 is defined by a body portion 1352 and end portions 1354, 1356 and has a top 1358 and a pair of spaced apertures 1200, 1202 surrounded by a pair of spaced toes 1360, 1362. The toes are preferably rounded and are formed by a connecting arc having a radius 1364 which is shown for one toe. The toes are defined by inside flanks 1366, 1370 and by outside flanks 1368, 1372 with the inside flanks joined at a crotch 1374 that is preferably rounded. The inside flanks of the link 1350 subtend an angle that is greater than the angle subtended by the inside flanks of the link 1310. As a result, the link 1310 contacts the sprocket on the outside flanks whereas the link 1350 contacts the sprocket on the inside flanks, i.e., within the crotch. The top of the link is joined to rounded sides 1376, 1378 defined by an arc formed by a radius 1380 having its centerpoint 1382 within the aperture. The sides are joined with the outside flanks at the end portions.

The configuration of the apertures may be identical to the apertures in the links of the non-guide row, except reversed to receive the pivot member. Preferably, however, the configuration of the apertures of the inside guide row link is substantially the same as the apertures for the flanking guide links and as a result are substantially the same as the pivot member. The configuration may be such that the inside guide row links are press fit onto the pin. Preferably, the configuration is such that the cross-section of the aperture of the inside guide row links is slightly greater than the pin so that the pin is interference fit into the aperture. In this way, the inside guide row links are prevented from rotating with respect to the pin. As a result, the set of inside non-guide row links will articulate with respect to the inside guide row links and guide links.

Since it is preferred that the inside links of the guide row do not rotate with respect to the pivot member, the configuration of the aperture is identical for each configuration of link shown in FIGS. 32 and 33. The apertures 1400, 1402 are defined by a plurality of arcs, which are more clearly shown in FIG. 34.

The apertures 1400, 1402 of the inside guide row links 1310, 1350 are provided on a horizontal pitch line 1404 and are each preferably symmetrical about a centerline 1410. The centerline is shown for one of the apertures. The other aperture has a similar symmetrical centerline (not shown). The apertures are rotated about the pitch line to form a positive tilt angle. The preferred aperture tilt angle is approximately three degrees, which is the angle between the symmetrical centerline and the pitch line of the link. The pitch length of the inside guide row link is measured along the pitch line, between the points of intersection of the front surface of the apertures and the pitch line. The pitch points 1406, 1408 are the points of vertical tangency of the aperture inside front surface. The pitch length of the inside guide row links is smaller than the pitch length of the inside non-guide row links.

The apertures have a front surface 1412 oriented toward the body portion of the link and a back surface 1416 oriented toward the end portion of the link. The front surface has a small curvature formed by an arc of a radius 1414 that is struck from a centerpoint located on the intersection of the pitch line and the symmetrical centerline. This radius is referred to as the rocker radius for the inside guide row link. Preferably, the rocker radius for the inside guide row links is greater than the inside non-guide row links as will be described below.

The back surface 1416 of the apertures is formed by an arc of a radius 1418 struck from a centerpoint 1420 located within the aperture on the symmetrical centerline. The aperture contains additional connecting arcs with connecting radii 1422, 1424, 1426, 1428 at least one of which joins the front surface and back surface.

The cross section of the pivot member is illustrated in FIG. 35. The pivot member is preferably pin that includes a body portion that has a front working surface 1502 with a small curvature that has substantially the same radius as the guide link and the inside guide row link and an arcuate back surface 1508. The back surface is constructed of an arc having a radius 1510 with a centerpoint 1512 within the body of the pin on the horizontal centerline 1514. The pin contains additional connecting arcs formed from connecting radii 1516, 1518, 1520, 1522 at least one of which connects the back surface to the front surface.

In operation, the movement of the pivot member of the rocker joint relative to the inside non-guide links for the interlaced silent chain embodiments illustrated in FIGS. 19–35 is identical to that illustrated in FIGS. 7, 8, and 9 and described above. It will be appreciated that a minimal clearance exists between the back surface of the pin 508 and 1508 and the back surface of the aperture 436 and 1216. This small clearance is provided at a point opposite the side of the rocking contact point. In the interlaced construction, the curved portion of the apertures of the inside links in the non-guide row act together to form a curved surface for rocking contact with the pin. The inside curved surface of the apertures of the inside non-guide links, therefore, effectively, forms a rocker for rocking action against the pin.

As noted above, for the interlaced silent chain embodiments of the present invention, the pitch length of inside guide row links is smaller than the pitch length of the inside non-guide row links. As a result, to obtain proper seating of all the links on a sprocket, the spacing between each adjacent tooth of the sprocket must be modified to compensate for the difference in pitch length. Consequently, it would be necessary to manufacture a sprocket that is unique to a particular chain.

Surprisingly, however, it has been found that the difference in pitch length can be compensated for by providing a rocker radius in the guide row links different from the rocker radius of the non-guide row links. In particular, it has been found that the difference in the pitch length can be compensated for by configuring the rocker radii such that the difference between the rocker radius of the guide row link and the rocker radius of the non-guide row link equals one-half the difference between the pitch length of the non-guide row link and the pitch length of the guide row link. As a result, a sprocket having circumferentially equally spaced teeth can be used.

Figure 20:
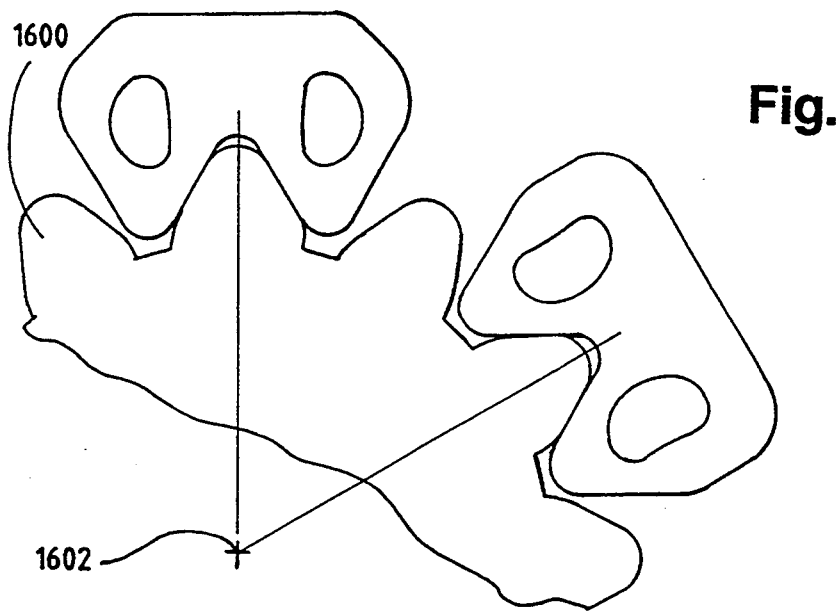
FIG. 20 is a side view of a portion of the embodiment of the chain of FIG. 19 seated on a sprocket.

FIG. 20 illustrates a sprocket 1600 having a centerpoint 1602 with an inside guide row link and an inside non-guide row link contacting the teeth of the sprocket. It will be appreciated by one skilled in the art, that the distance from the sprocket centerpoint to the line connecting the center of the rocker radius for each link provides an indication of the seating of each row of links on the sprocket. Most desirably, the distance is the same for each row so that each link in each row is seated on the sprocket an optimal amount. As a result of configuring the difference between the rocker radius for the guide row and rocker radius for the non-guide row to be one-half the difference between the pitch of the non-guide row and the pitch of the guide row, it will be seen that the distance from the centerpoint of the sprocket to the line connecting the center of the rocker radius is the same for the inside guide row links and the inside non-guide row links.

While several embodiments of the invention have been described and illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A rocker joint for a chain constructed of an assembly of links and pivot members, the chain comprising:
   a. a plurality of sets of interleaved links with adjacent sets being interlaced, each link having a pair of spaced apertures defined by a series of surfaces with at least some of the links having one convexly arcuate surface, one set of apertures of one link set being transversely aligned with one set of apertures of the next adjacent link set; and,
   b. at least one of the pivot members having a substantially flat front surface and a convex back surface defined by a plurality of radii, the pivot member being received in the apertures of some of the links such that the front surface of the pivot member and the convexly arcuate surface of the link aperture engage and rock on one another and the back surface of the pivot member being positioned for clearance from the aperture back surface in a chain tight strand as the surfaces move relative to one another before the chain articulates.

2. The rocker joint of claim 1 wherein the chain includes a plurality of sets of flanking guide links interleaved with sets of inside links wherein the sets of inside links include sets of inside guide row links interlaced with sets of inside non-guide row links.

3. The rocker joint of claim 2 wherein the apertures within the guide links and the inside guide row links have at least one curved surface and the apertures within the inside non-guide row links have a plurality of curved surfaces.

4. The rocker joint of claim 3 wherein the apertures within the guide links and the inside guide row links have a front surface with a small curvature defined by a radius and the apertures within the inside non-guide row links have a curved front surface defined by a radius with the radius defining the front surface of the guide links and the inside guide row links being greater than the radius defining the inside non-guide row links.

5. The rocker joint of claim 4 wherein the pivot member is received in the apertures of the set of guide links and the set of inside guide row links such that the pivot member back surface engages the curved surface defined by the guide link and the inside guide row links, thereby preventing substantial rotation of the pivot member relative to the guide link and the inside guide row links.

6. The rocker joint of claim 4 wherein the guide links and the inside guide row links have a pitch length of a first distance and the inside non-guide row links have a pitch length of a second distance.

7. The rocker joint of claim 6 wherein the pitch length of the inside non-guide row links is greater than the pitch length of the inside guide row links and the guide row links.

8. The rocker joint of claim 3 wherein the pivot member is received in the apertures of the set of inside non-guide row links and the front surface of the pivot member and a convexly curved surface of the aperture of the inside non-guide row link engage and rock on one another.

9. The rocker joint of claim 8 wherein the pivot member is a single pin of continuous cross-section having a front working surface with a small curvature and a convex back surface, the pin front and back surfaces being connected by a series of curved surfaces.

10. The rocker joint of claim 8 wherein the apertures of the inside non-guide row links include at least two convex curves, each of the convex curves being defined by a radius having a center point, each center point of each of the radii being on the same side of the aperture.

11. The rocker joint of claim 10 wherein the apertures of the inside non-guide row links are located between the center points of the radii forming the apertures.

12. The rocker joint of claim 8 wherein the inside non-guide row link aperture includes a curved front surface and a curved back surface with the pivot member back surface and the aperture back surface being in generally spaced apart relation when the rocker joint is oriented in a straight-pull position of the chain.

13. The rocker joint of claim 12 wherein the pivot member back surface and the aperture back surface are in generally spaced apart relation for substantially all positions of the chain.

14. The rocker joint of claim 2 wherein the inside links include a pair of depending toes adapted to contact a sprocket tooth.

15. The rocker joint of claim 2 wherein at least some of the inside guide row links have a configuration and at least some of the inside non-guide row links have a configuration different from the configuration of the inside guide row links.

16. The rocker joint of claim 15 wherein at least some of the inside guide row links have a first configuration and the other inside guide row links have a second configuration different from the first configuration.

17. The rocker joint of claim 15 wherein at least some of the inside non-guide row links have a first configuration and the other inside non-guide row links have a second configuration different from the first configuration.

18. A power transmission chain constructed of an assembly of links and pivot members, the chain comprising:
   a. a plurality of sets of guide links interleaved with sets of inside links with adjacent sets of inside links being interlaced, each link having a pair of spaced apertures defined by a series of surfaces, the apertures of one link set being transversely aligned with one set of apertures of the next adjacent link set, the apertures within the guide links having at least one curved surface, the apertures within at least some of the inside links having a plurality of convexly curved surfaces; and
   b. pivot members having a substantially flat front surface and a convex back surface, the back surface being defined by a plurality of radii, the pivot members being received in the apertures of the guide links such that the pivot member back surface engages the curved surface defined by the guide link thereby preventing substantial rotation of the pivot member relative to the guide link, the pivot member also being received in the apertures of at least some of the inside links such that the front surface of the pivot member and a convexly curved surface of the inside link aperture engage and rock on one another and the back surface of the pivot member is positioned for clearance from the aperture back surface in a chain tight strand as the surfaces move relative to one another before the chain articulates.

19. The power transmission chain of claim 18 wherein the pivot member is a single pin having a front working surface and the back convex surface being connected by a series of curved surfaces.

20. The rocker joint of claim 18 wherein the chain includes a plurality of sets of flanking guide links interleaved with sets of inside links to define sets of inside guide row links interlaced with sets of inside non-guide row links.

21. The rocker joint of claim 20 wherein the apertures within the guide links and the inside guide row links have at least one curved surface and the apertures within the inside non-guide row links have a plurality of curved surfaces.

22. The rocker joint of claim 21 wherein the apertures within the guide links and the inside guide row links have a front surface with a small curvature defined by a radius and the apertures within the inside non-guide row links have a curved front surface defined by a radius with the radius defining the front surface of the guide links and the inside guide row links being greater than the radius defining the inside non-guide row links.

23. The power transmission chain of claim 22 wherein the inside links have a pitch length of a first distance, the guide links having a pitch length of a different distance.

24. The power transmission chain of claim 23 wherein the pitch length of the inside links is greater than the pitch length of the guide links.

25. The power transmission chain of claim 20 wherein the inside links include a pair of toes separated by a crotch.

26. The power transmission chain of claim 18 wherein the inside links include apertures having at least two convex curves, each of the convex curves being defined by a radius having a center point, each center point of each of the radii being on the same side of the aperture.

27. The power transmission chain of claim 26 wherein the inside links include apertures located between the center points of the radii of the convex curves.

28. The power transmission chain of claim 27 wherein the inside links include apertures having a positive tilt angle.

29. The power transmission chain of claim 26 wherein the chain includes inside links having apertures located outside the center points of the radii of the convex curves.

30. The power transmission chain of claim 29 wherein the chain includes inside links having apertures located outside the center points of the radii of the convex curves.

31. A power transmission chain for use with a sprocket, the chain constructed of an assembly of links and pivot members, the chain comprising:
   a plurality of sets of guide links including pairs of flanking guide links interleaved with sets of inside links having links with pairs of depending toes to contact the sprocket, adjacent sets of inside links being interlaced to define sets of inside guide row links interlaced with sets of inside non-guide row links, each link having a pair of spaced apertures defined by a series of surfaces, the aperatures of one link set being transversely aligned with one set of apertures of the next adjacent link set, the apertures within the guide links and the inside guide row links having at least one curved surface, the apertures within the inside non-guide row links having a plurality of curved surfaces, the pivot members having a substantially flat surface with a small curvature and a convex back surface, the back surface being defined by a series of curved surfaces, the pivot members being received in the aperatures of the guide links and the inside guide row links such that its back surface engages the curved surface defined by the guide link and the inside guide row links thereby preventing substantial rotation of the pivot member relative to the guide link, the pivot member being received in the apertures of the inside non-guide row links such that the front surface of the pivot member and a curved surface of the inside non-guide row link aperture engage and rock on one another, with the back surface of the pivot member being movable in the aperature of the inside non-guide row links as the surfaces move relative to one another when the chain articulates.

32. The power transmission chain of claim 31 wherein the aperture within the guide links and the inside guide row links have a front surface with a small curvature defined by a rocker radius and the apertures within the inside non-guide row links have a curved front surface defined by a rocker radius with the rocker radius forming the front surface of the guide links and the inside guide row links being greater than the rocker radius defining the inside non-guide row links.

33. The power transmission chain of claim 32 wherein the pivot member is received in the apertures of the set of guide links and the set of inside guide row links such that the pivot member back surface engages the curved surface formed by the guide link and the inside guide row links, thereby preventing substantial rotation of the pivot member relative to the guide link and the inside guide row links.

34. The rocker joint of claim 33 wherein the pivot member is received in the apertures of the set of inside non-guide row links and the front surface of the pivot member and a convexly curved surface of the aperture of the inside non-guide row link engage and rock on one another.

35. The rocker joint of claim 34 wherein the guide links and the inside guide row links have a pitch length of a first distance and the inside non-guide row links have a pitch length of a second distance.

36. The rocker joint of claim 35 wherein the pitch length of the inside non-guide row links is greater than the pitch length of the inside guide row links and the guide row links.

37. The power transmission chain of claim 36 wherein the sprocket has circumferentially equally spaced teeth.

38. The power transmission chain of claim 37 wherein the difference between the rocker radius defining the guide links and the inside guide row links and the rocker radius defining the inside non-guide row links being one-half the difference between the pitch length of the inside non-guide row links and the pitch length of the inside guide row links and the guide links.

* * * * *

UNITED STATES PATENT AND TRADEMARK OFFICE
CERTIFICATE OF CORRECTION

PATENT NO. : 5,423,724                         Page 1 of 2
DATED : June 13, 1995
INVENTOR(S) : Edward H. Cole,e et al It is certified that error appears in the above-indentified patent and that said Letters Patent is hereby corrected as shown below:

<u>On the Title Page</u>

In column 1, line 7, after "Assignee: Borg-Warner Automotive, Inc., Sterling Heights, Mich." insert --Notice: The portion of this patent subsequent to October 17, 2011, has been disclaimed.--

<u>In the Claims</u>
Column 23,
In claim 31, line 5 delete "aperatures" and insert --apertures--.

In claim 31, line 12 after "flat" and insert --front--.

In claim 31, line 16, delete "aperatures" and insert --apertures--.

UNITED STATES PATENT AND TRADEMARK OFFICE
CERTIFICATE OF CORRECTION

PATENT NO. : 5,423,724
DATED : June 13, 1995
INVENTOR(S) : Edward H. Cole, et al It is certified that error appears in the above-indentified patent and that said Letters Patent is hereby corrected as shown below:

In claim 31, line 27, delete "aperature" and insert ---aperture--.

In claim 32, line 31, delete "aperture" and insert ---apertures--.
    Column 24, line 1,
    In claim 32, line 35 delete "forming" and insert ---defining--.

In claim 33, line 8, delete "formed" and insert ---defined--.

Signed and Sealed this

Ninth Day of April, 1996

Attest:

BRUCE LEHMAN

*Attesting Officer*      *Commissioner of Patents and Trademarks*